Nov. 11, 1952   E. A. BODKIN   2,617,169
METHOD OF EXTRUDING POROUS MATERIAL
Filed July 15, 1949

SECTION A-A

PREPRESSING CYCLE

SECTION A'-A'

EXTRUSION CYCLE

ERNEST A. BODKIN
*INVENTOR.*

BY Raymond W. Barclay

ATTORNEY OR AGENT

Patented Nov. 11, 1952

2,617,169

UNITED STATES PATENT OFFICE 2,617,169

METHOD OF EXTRUDING POROUS MATERIAL

Ernest A. Bodkin, Pitman, N. J., assignor to Socony-Vacuum Oil Company, Incorporated, a corporation of New York Application July 15, 1949, Serial No. 105,027

4 Claims. (Cl. 25—156)

This invention relates to a method for producing extruded porous materials characterized by a high degree of physical hardness. More particularly, the present invention is directed to a process for improving the extrudability and handling strength of mechanically shaped solid porous masses such as those finding use as catalysts, adsorbents, desiccants, catalyst supports, carriers and various other applications where rigidity, crushing resistance, and ability to withstand abrasion upon handling are considered desirable attributes.

The preparation of extruded porous particles has heretofore been carried out by forcing a granular or powdered material under pressure through a die. The forms which the extruded material has assumed include rods, cylinders, tubes, etc., of various shapes, sizes, dimensions, and proportions. The porous extrudates so produced have found wide favor in a variety of industrial operations due to their relative ease of handling, the increased contact surface exposed and the improved passage of liquid or vapor therethrough.

Under the usual conditions of extrusion, however, carried out by pressing a moist porous mass through a die, the resulting extruded particles often appear chalky and do not have adequate strength or hardness sufficient to resist abrasion under all conditions of handling and treatment. This undesirable property leads to crumbling and disintegration of the extruded particles during use, rendering them unsuited for their intended purpose, resulting in loss of the particle-form extrudate and causing contamination of material brought in contact therewith. For example, it is well known that water and other volatile components can be removed from liquid and solid materials containing the same by agitation of the mixture with porous adsorbent particles such as those formed by extrusion of an inorganic oxide gel. Upon tumbling the mixture with extruded gel particles, a certain amount of breakage, chipping, and abrasion of the gel particles occurs. This, in turn, contaminates the mixture undergoing treatment, necessitating either a subsequent refining operation to remove the gel fines or disposal of the contaminated material, thereby placing a distinct economic burden upon the process employing such extruded gel particles. The importance of this problem is emphasized when it is considered that certain materials can only be efficiently dried by intimate contact with adsorbents of the above type. Among such materials are found chemical compounds which are decomposed by heat, organic substances which tend to char, biologicals in which potency is adversely affected by heat, and the like. Similarly, in other operations wherein an extruded porous mass having adsorbent or catalytic properties is brought into contact with vapors or liquids, the serious problem of breakage and abrasion of the extruded particles is encountered.

Thus, many operations for the conversion of hydrocarbon materials are carried out in the presence of a porous contact mass composed of particles which themselves have a catalytic effect or which are impregnated with or act as a support for other catalytic material of a nature appropriate to the result desired. Such operations may contemplate the conversion of hydrocarbons of high boiling point to those of lower boiling point, or the polymerization of light or gaseous hydrocarbons to hydrocarbons of higher boiling point. Other operations of like nature employing solid porous catalytic particles include dehydrogenation, hydrogenation, polymerization, alkylation, reforming, aromatization, desulfurization, oxidation and similar conversions of hydrocarbon materials.

These catalytic processes are advantageously carried out employing methods wherein the catalyst or contact mass is subjected to continuous handling. In such operations, a continuously moving stream of hydrocarbon feed is contacted with a continuously moving stream of catalyst for the accomplishment of conversion, and thereafter the catalytic material is continuously regenerated and returned to the conversion zone. This continuous handling and regeneration of the catalyst particles results in considerable breakage and constant abrasion using up the catalyst and giving rise to an excessive amount of fines, which are a loss since they generally cannot be re-used in the same catalytic equipment. Furthermore, there is a tendency of the catalyst fines suspended in the gas or vapor present to act as an abrasive in a manner analogous to sand blasting. This not only wears away the equipment, but also causes the catalyst to take up foreign matter detrimental to its catalytic properties. A hard porous catalytic material having the ability to resist abrasion during the necessary handling involved during continual conversion and regeneration is definitely a desirable attribute in overcoming the disadvantages heretofore prevalent in the art.

Moreover, in hydrocarbon conversions carried out at elevated temperatures in the presence of solid porous catalysts, the deposition of carbon on the surface of the catalyst takes place. This carbonaceous coating soon covers the surface of the catalyst, necessitating removal of the coating before the catalyst can continue to promote the reaction. In some catalytic operations, the active life of the catalyst is only a few minutes "on stream," after which the carbon is removed by burning to reactivate the mass and permit efficient operation of the process. The provision of a catalyst which retains its porosity but has a high degree of hardness, rendering the same resistant to the thermal shock encountered upon being used in high temperature conversions and during repeated regeneration, is a distinct advantage in any catalytic process.

One main object of this invention, therefore, is to provide porous extruded particles of improved hardness characteristics. Another object is the provision of a process for improving the extrudability and handling strength of porous extruded particles such as adsorbents, catalysts, desiccants, and the like. A further object is to provide a method for producing extruded porous particles having a high resistance to abrasion, chipping and breakage. A still further object is the provision of a hard porous particle-form catalytic mass capable of withstanding severe thermal treatment without adverse effect. Other objects and advantages of this invention will be apparent to those skilled in the art from the following description.

In accordance with the process of this invention, it has been discovered that the hardness characteristics of extruded material can be effectively improved by a prepressing of the porous mass prior to extrusion. It has been found that if the porous granular or powdered feed material to be extruded is first subjected to a prepressing operation and thereafter extruded, the resulting extruded mass has a substantially greater physical hardness than when the feed material is extruded by conventional procedure in the absence of any prepressing.

It would appear that the improved hardness characteristics of the extruded product obtained by the present procedure may be attributed to the substantial removal of air from the feed charge prior to extrusion. Under the usual procedures for extrusion heretofore employed, loosely packed granular or powdered porous material was conducted to an extrusion chamber and pressed from said chamber through a die to yield an extrudate of the desired shape. The loosely packed feed material contained a considerable quantity of air, only part of which was removed during the extrusion operation, the remainder of the air being trapped within the porous mass so that the resulting extruded material contained small quantities of occluded air. The presence of small air pockets in the porous extruded mass has a direct effect on the hardness properties of the extrudate, rendering the same chalky and subject to crumbling and abrasion. Upon removing the air from the charge material by pressing the same prior to extrusion, and thereafter extruding the prepressed mass, it has been discovered that the resulting extruded product has distinctly improved hardness characteristics. The extruded material so obtained is suitably employed in operations requiring hard, porous particles, thereby greatly expanding the field of uses to which porous extrudates may be put.

Any method of prepressing the porous feed charge to remove air therefrom prior to extrusion is within the purview of this invention. A feasible and highly effective means for accomplishing the objects of this invention is shown in the attached drawing.

Referring more particularly to the drawing.

Figure 1:
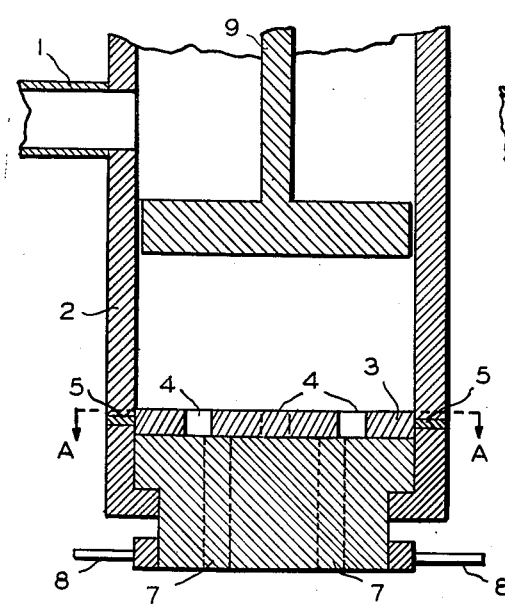
Fig. 1 is a sectional view of a suitable device for carrying out the operation during the prepressing cycle.

To obtain the hard extruded product of this invention, porous feed material is led through conduit 1 to extrusion chamber 2. On the bottom of said chamber is a circular prepressing plate 3 having a number of openings spaced along its circumference. The prepressing plate is fixed to the walls of the extrusion chamber by supports 5. Directly below the prepressing plate is a die plate 6 provided with a number of openings 7 which, upon lateral translation of the die plate by means of handles 8, can be made to coincide with the openings of the prepressing plate, thereby permitting extrusion of the porous charge material when pressure is applied thereto by means of extrusion ram 9. When the die plate is turned so that the openings therein do not coincide with openings of the prepressing plate, then none of the charge material is extruded since the same is pressed against a solid surftce.

Figure 3:
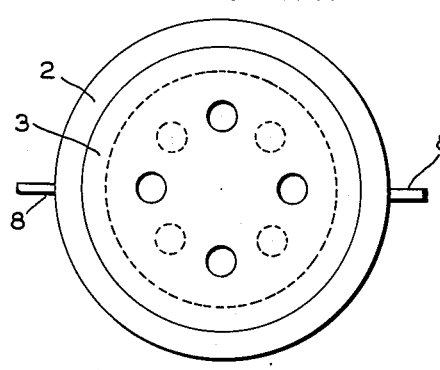
Fig. 3 is a plan view of the device shown in Fig. 1.

Thus, as shown in Figures 1 and 3, the openings of the prepressing plate are closed since the position of the die plate is such that the openings therein do not coincide with the openings of the prepressing plate. Upon application of pressure to the porous charge material by the downward movement of the extrusion ram, air contained in and around said charge material is pressed therefrom and permitted to escape through the small clearance between the extrusion chamber wall and the ram head. Since the charge material is usually moist, any residual air is dissolved under pressure in the water contained in the charge.

Figure 2:
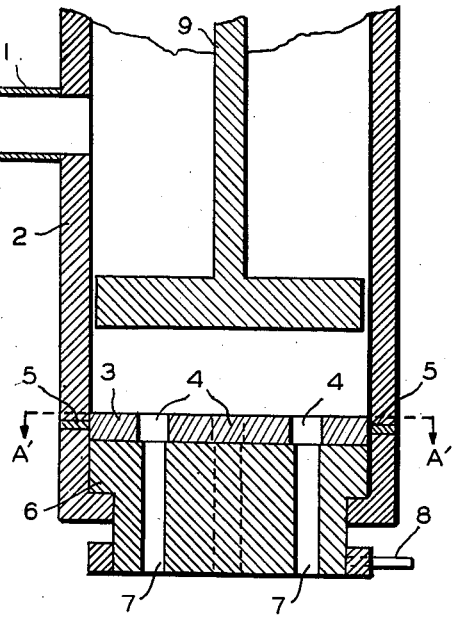
Fig. 2 is a sectional view of the device during the extrusion cycle.
Figure 4:
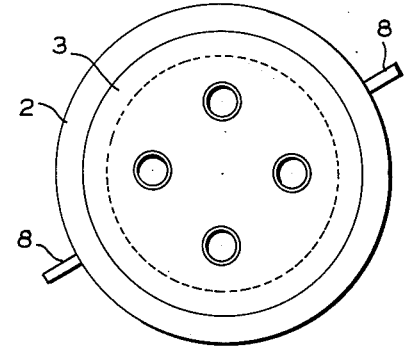
Fig. 4 is a plan view of the device shown in Fig. 2.

Following the completion of the prepressing cycle, the die plate is rotated along the horizontal plane until the die openings coincide with the openings of the pressing plate, as shown in Figures 2 and 4. The charge material is then extruded through the die openings by the downward movement of the extrusion ram. The extruded spaghetti-like material may thereafter be cut into lengths of desired size and dried to yield smooth, porous particles of satisfactory strength sufficient to withstand any necessary handling. In the absence of the prepressing step, the particles produced are of inferior physical strength, and nonuniform and chalky in appearance. In addition, prepressing of the charge prior to extrusion improves the uniformity of flow of the extruded material through the die openings. In the absence of the prepressing step, a somewhat erratic and uneven flow of the feed charge results, yielding a porous, physically weaker product.

While the prepressing is preferably carried out immediately prior to extrusion and in the same apparatus to avoid undue contact with air, it is entirely within the purview of this invention that the pressing and extrusion operations may be carried out in separate pieces of apparatus, providing the pressed porous charge material is not thereafter brought into contact with air. Thus, the porous charge may be subjected to sufficient pressure to substantially de-air the same in any suitable pressing device and thereafter be transferred to an extruder. It is essential, however, for purposes of this invention that any prolonged contact of the porous charge with air be strictly avoided after it has once been prepressed.

It is contemplated that any porous material, compound or any mixture of solid materials may be extruded in accordance with the process of this invention. The charge material may thus be any of the porous adsorbent materials commonly subjected to extrusion, such as granular or powdered charcoal, various naturally occurring clays, synthetic inorganic oxide hydrogels, gelatinous precipitates, and the like, or mixtures of such materials. For example, silica hydrogel may be admixed with hydrous metal oxide hydrogels, such as those of alumina, zirconia, titania, manganese oxide, thoria, and the like. These various hydrogels may be composited by any one of a number of methods. Thus, the components of a gel charge may be separately, concurrently, or consecutively allowed to set in the form of hydrogels. For example, silica and alumina hydrogels may be formed separately from solutions of suitable salts and then mixed mechanically or a hydrosol of silica and alumina may be prepared which sets to a silica-alumina hydrogel. Solids which are not obtainable thoroughly admixed with other solids may be so mixed by mechanical means by adding two or more materials to a ball mill, rod mill or other pulverizing unit and agitating or grinding the materials until the desired intimacy of mixing is attained. Various other procedures may be followed wherein components are co-precipitated or separately precipitated and the hydrated oxide components intimately admixed. Silica hydrogel, for example, may be immersed in solutions of metal salts and hydrous oxides deposited upon the silica hydrogel by means of hydrolytic adsorption, after which the mass may be formed into any desired shape in accordance with this invention.

The porous charge material should be characterized by a sufficient degree of plasticity and moisture so as to properly lubricate the dies of the extrusion apparatus. In the case where the charge is a dry, porous mass, water or other liquid is preferably admixed therewith and the resultant mixture kneaded or ball-milled to bring the charge in condition suitable for extrusion. In those cases where the charge is made up of wet clay, freshly formed hydrogel or other material having an excess of moisture, the amount of water in the charge may be decreased by admixing with a dry, powdered, porous material which may be either of the same or a different composition from that of the wet charge stock. In the case of hydrogels, water contained therein may be released by freezing and thawing of the hydrogel in accordance with the general procedure described in U. S. Patent 2,480,669. It is thus contemplated that any of the preliminary treatments for placing the porous charge material in extrudable form which have previously been used in the prior art may be employed in readying the charge material for use in the present extrusion procedure.

The pressures employed during the prepressing step of the present process will generally be such that as to substantially de-air the porous charge material. The particular pressure to be applied will be largely dependent on the nature and condition of the specific charge. Preferably, pressures of at least 100 pounds per square inch are employed. Pressures ranging as high as 10,000 pounds per square inch may be used in some instances. Generally, however, optimum prepressing pressures have been found to be between about 250 and about 600 pounds per square inch.

The prepressing periods will be of such duration as to enable substantially all of the air contained in the porous charge material to escape. The period of prepressing is ordinarily inversely proportionate to the amount of pressure applied. Thus, as a general rule, where a substantially high prepressure is applied, the duration of such pressure may be comparatively short and, conversely, where a lower prepressure is used, the time during which it is applied should be correspondingly greater in order to ultimately obtain a satisfactory extruded product. Prepressing periods will thus vary widely but will generally be between about 10 and about 180 seconds, and more usually will lie in range of from about 30 to about 60 seconds.

After the prepressing operation, the porous charge is extruded through the die openings. The pressure applied during extrusion will usually be greater than 100 pounds per square inch and generally not in excess of 10,000 pounds per square inch. The extruded material, upon emerging from the die, is ordinarily cut into short cylinders which are subsequently handled so as to maintain the identity of the individual particles. Thereafter, the particles are carefully dried and calcined at approximately 1000 to 1500° F. The average size of the extruded particles may vary greatly but ordinarily will be within the approximate range of 2 to 14 mesh. The size is not, however, necessarily restricted to short cylindrical shapes, since various other sizes or shapes may be formed during extrusion, depending largely upon the particular use to which the extrudate is to be subjected.

The water content of the porous mass undergoing extrusion is ordinarily such as to give a firm product, while containing sufficient moisture to properly lubricate the dies. The amount of water in the charge material depends in part on the particular composition and state of sub-division of the material. Generally, the water content of the charge, on a wet basis, will be between about 50 and about 85 per cent by weight. While water is preferred as the moistening or binding material for lending the desired degree of plasticity to the porous charge, other binding agents may be employed instead of or in addition to water. Where the binding or wetting material is a liquid other than water, it should desirably be capable of dissolving air under the pressures applied during the prepressing operation. Other materials capable of aiding extrusion may be incorporated in the charge. Thus, the porous charge may have admixed therewith small amounts of castor oil, oleic acid, dextrin, locust bean gum, and other lubricants or improving agents for extrusion well known in the art.

The following examples will serve to illustrate the method of this invention without limiting the same:

*Example I*

A silica-alumina hydrosol was prepared by mixing 1.00 volume of a solution of sodium silicate containing 157.0 grams of $SiO_2$ per liter and 1.00 volume of a solution containing 39.79 grams of aluminum sulfate and 30.51 grams of sulfuric acid per liter. The resulting colloidal solution was ejected from a nozzle in the form of globules into a column of gas oil whose depth was about eight feet. The globules of solution fell through the oil and gelled before passing into a layer of water located beneath the oil. The time of gelation for the concentrations and proportions of reactants given above was about 4 seconds. The spheroidal particles of hydrogel were conducted out of the bottom of the column into a stream of water and, on removal from the water, base-exchanged with an aqueous solution of aluminum sulfate and water-washed.

The hydrogel particles were then frozen by immersion in kerosene maintained at a temperature of 15° F. The frozen hydrogel was then drained free of kerosene and thawed by heating with live steam to a temperature above 32° F. Freezing and thawing cause the hydrogel particles to disintegrate into small granules and release about 63 to 67 per cent by weight of water originally present in the freshly formed hydrogel.

The water so released was decanted off and the residual hydrogel granules centrifuged in a basket-type centrifuge for 1½ minutes at about 3300 R. P. M. to give a hydrogel of 75-77 per cent by weight moisture content. The hydrogel granules were then conducted to an extrusion device such as shown in the accompanying drawing and prepressed at 2900 pounds per square inch for about 30 seconds to substantially de-air the same. The prepressed charge was then extruded under a pressure of 800 pounds per square inch through die openings of approximately one-quarter inch diameter. The resultant spaghetti-like material was cut in particles approximately one-quarter inch long.

The extruded hydrogel particles were dried at a temperature of 90° F. (dry bulb) and 70 per cent relative humidity by circulation of air through a 2-inch bed of the particles, at a rate of about 100 cubic feet per minute per square foot of hydrogel cross-sectional area. The drying time required to reach equilibrium was about 12 hours.

At the end of this time, the resultant dried particles were tempered by heating in an electric furnace at the rate of 1° F. per minute until a temperature of 500° F. was reached and thereafter by heating at a rate of 3° F. per minute until a temperature of 1400° F. was reached. The particles were held at this temperature for 10 hours and then permitted to cool, yielding hard, porous silica-alumina gel particles.

For purposes of comparison, a silica-alumina hydrogel was prepared and extruded as described above, with the exception that the prepressing operation was omitted. The two batches of extruded particles were compared as to appearance, handling strength, density and hardness. The two forms of gel were subjected to a hardness test which consists of tumbling an 80 c. c. sample of material in a one-pound grease can with eight $\tfrac{13}{16}''$ steel balls, 50 grams each, at 80 R. P. M. on a paint roller mill for a period of one hour, then screening the same to determine the quantity which was powdered and broken down to a size smaller than the original. The percentage of unbroken particles is designated as hardness index. The results are summarized below:

| Nature of Porous Charge Material | Silica-Alumina Hydrogel | |
|---|---|---|
| Prepressing Pressure Applied (lbs. per square inch) | 2,900 | 0 |
| Extrusion Pressure Applied (lbs. per square inch) | 800 | 800 |
| Inspection of Freshly Extruded Particles: | | |
| Appearance | Slightly Chalky | Very Chalky |
| Handling Strength | Good | Fair |
| Inspection of Finished Particles: | | |
| Packed Density (grams/c.c.) | 0.58 | 0.56 |
| Hardness Index | 53 | 11 |

*Example II*

A silica-alumina-manganese oxide hydrogel was prepared by mixing 1.00 volume of sodium silicate containing 157.0 grams of SiO₂ per liter and 1.00 volume of a solution containing 39.79 grams of aluminum sulfate and 30.51 grams of sulfuric acid per liter to give a silica-alumina hydrogel as described in the preceding example. The hydrogel was then base exchanged with aqueous solutions containing two equivalent weights of manganese sulfate and one-half equivalent weight of ammonium sulfate based on the zeolitic sodium content of the hydrogel (about 4 per cent Na₂O). The amount of MnO incorporated into the silica-alumina hydrogel by this means was about 4 per cent by weight based on the finished dry product. The other components of silica and alumina being present, the respective amounts of about 90 per cent and about 6 per cent by weight were based on the finished dry gel.

The resulting silica-alumina-manganese oxide hydrogel was then frozen, thawed, and centrifuged as in Example 1. The hydrogel granules so obtained were placed in an extruder similar to that shown in the drawing and prepressed at 320 pounds per square inch for about 30 seconds to remove a substantial portion of air from the hydrogel. The prepressed charge was then extruded under a pressure of 400 pounds per square inch and the resulting extruded spaghetti-like material was cut into particles and dried as described in the preceding example.

A second batch of silica-alumina-manganese oxide hydrogel was prepared and extruded in accordance with the above procedure, except that the prepressing operation was omitted. The two batches of extruded particles were compared as to appearance, handling strength, density and hardness. The results are summarized below:

| Nature of Porous Charge Material | Silica-Alumina-Manganese Oxide Hydrogel | |
|---|---|---|
| Prepressing Pressure Applied (lbs. per square inch) | 320 | 0 |
| Extrusion Pressure | 400 | 400 |
| Inspection of Freshly Extruded Particles: | | |
| Appearance | Slightly chalky | Chalky |
| Handling Strength | Good | Fair |
| Inspection of Finished Particles: | | |
| Packed Density (grams/c. c.) | 0.65 | 0.61 |
| Hardness Index | 72 | 58 |

*Example III*

An extrudable mass of a silica-alumina porous clay of the type used in promoting the catalytic cracking of petroleum hydrocarbons was prepared by mixing 12 pounds of clay with 2400 c. c. of water in a mechanical mixer for a period of about 7 minutes.

A part of the clay was thereafter placed in an extruder similar to that shown in the drawing and prepressed at 1750 pounds per square inch for about 30 seconds to remove a substantial portion of air from the clay. The prepressed charge was then extruded under a pressure of 800 pounds per square inch. The resulting extruded spaghetti-like material was cut into particles and dried for 18 hours at room temperature and then tempered at 1050° F. for 3 hours.

A second batch of clay from the mixing operation was extruded directly, omitting the prepressing operation. The extruded mass was then cut into particles, dried, and tempered as above. The two batches of extruded particles were compared as to appearance, handling strength, density, and hardness. The results are summarized below:

| Nature of Porous Charge Material | Clay | |
|---|---|---|
| Prepressing Pressure Applied (lbs. per square inch) | 1,750 | 0 |
| Extrusion Pressure | 800 | 800 |
| Inspection of Freshly Extruded Particles: | | |
| Appearance | Slightly Chalky | Chalky |
| Handling Strength | Good | Fair |
| Inspection of Finished Particles: | | |
| Packed Density (grams/c. c.) | 0.62 | 0.62 |
| Hardness Index | 87 | 85 |

It will thus be seen from the foregoing examples that the handling strength and hardness characteristics of porous extruded particles are appreciably improved by subjecting the charge material to a prepressing operation before extruding the smae. While the method of this invention has been illustrated with the use of inorganic oxide hydrogel composites and porous clay, it is generally applicable in improving the hardness of any porous extruded material wherein air is contained in the charge undergoing extrusion. Those skilled in the art will, accordingly, recognize and understand that the particular chemical composition of the charge employed in the present procedure is of little consequence and that the method of this invention may be used in treating any porous material from which air may be removed by the application of pressure prior to extrusion.

I claim:

1. A method for extruding inorganic hydrogel, which comprises feeding a charge of said hydrogel characterized by a water content, on a wet basis, of between about 50 and about 85 per cent by weight to a press, removing substantially all of the air contained in and around said hydrogel by compressing the same prior to extrusion against a solid surface of said press and thereafter extruding the pressed hydrogel while maintaining the same in a substantially de-aired condition by passage through an extrusion die.

2. A method for improving the hardness characteristics and handling strength of extruded inorganic gel particles, which comprises removing substantially all of the air contained in and around a charge of inorganic hydrogel having a water content, on a wet basis, of between about 50 and about 85 per cent by weight by subjecting the same prior to extrusion to a pressure within the range of about 250 to 600 pounds per square inch, extruding said pressed hydrogel while maintaining the same in a substantially de-aired condition, cutting the extruded hydrogel into particles of predetermined length and drying said particles to yield a hard, porous particle-form gel product having a high resistance to abrasion.

3. A method for extruding inorganic hydrogel, which comprises feeding a charge of the same having a water content, on a wet basis, of between about 50 and about 85 per cent by weight to a press, removing substantially all of the air from said charge by compressing the same prior to extrusion, causing at least a portion of said air to be dissolved in the water present in said hydrogel, and thereafter extruding the pressed hydrogel while maintaining the same in a de-aired condition by passage through an extrusion die.

4. A method for improving the hardness characteristics and handling strength of extruded gel, which comprises removing substantially all of the air contained in and around a charge of finely divided hydrogel having a water content, on a wet basis, of between about 50 and about 85 per cent by weight by compressing the same prior to extrusion, extruding said pressed hydrogel while maintaining the same in a substantially de-aired condition, and thereafter drying the extruded hydrogel to yield a hard, porous gel product.

ERNEST A. BODKIN.

REFERENCES CITED

The following references are of record in the file of this patent:

UNITED STATES PATENTS

| Number | Name | Date |
|---|---|---|
| 168,743 | Haws | Oct. 11, 1875 |
| 1,156,096 | Price | Oct. 12, 1915 |
| 1,500,739 | Howard et al. | July 8, 1924 |
| 1,614,526 | Lambie et al. | Jan. 18, 1927 |
| 1,677,808 | Alassio | July 17, 1928 |
| 1,699,502 | Crowley | Jan. 15, 1929 |
| 2,460,811 | Davies et al. | Feb. 8, 1949 |